Oct. 30, 1934.  K. E. BEMIS  1,978,735

SANDWICH TOASTER

Filed May 28, 1934

INVENTOR
BY
ATTORNEY

Patented Oct. 30, 1934

1,978,735

UNITED STATES PATENT OFFICE 1,978,735

SANDWICH TOASTER

Kenneth E. Bemis, San Francisco, Calif.

Application May 28, 1934, Serial No. 727,859

11 Claims. (Cl. 219—19)

This invention is a sandwich toaster which is adaptable to many additional uses, such as broiling hamburger, toasting bread, roasting wieners, and other similar purposes, and has improved features over all devices of the same class heretofore used.

In present types of sandwich toasters, no means is provided for preventing foods from curling up to contact with the heating unit, and the heating units are difficultly replaceable. In some, the heat is dead-ended, causing irregular heating, and no means of grease disposal is provided.

This invention overcomes all of these objectionable features and provides a substantially fumeless and odorless operating device, and in which the heating units can be quickly and conveniently replaced by the layman, since no skill is required in the installation.

The main object of the invention therefore is to provide a sandwich toaster with means for preventing the curling of food being toasted and the consequent contacting thereof with the heating unit, causing undesirable fumes and odors, the invention therefore being suitable for operation under the most particular or exacting conditions.

Another object of the invention is to provide a unit as outlined with a roasting compartment which is not dead-ended, but which permits the free circulation of air through the compartment and about the unit.

A further object of the invention is to provide collecting means for oils or juices released from the food products by the roasting or heating process, and to also provide an easily and conveniently removable receptacle for such oils or juices.

A still further object of the invention is to provide holders for the food products which engage and retain the food product while permitting the heat radiated from the heating unit to strike the food product directly, and also to provide holders of a reversible type in which thinner portions may be secured, and for changing the relative spacing of the product from the unit, and which holder is also reversible for the cooking operation, obviating the necessity of turning the food in or on the holder.

A still further object of the invention is to provide a device as outlined with quickly and conveniently replaceable heating units.

Other objects and advantages of the invention will become apparent as the following description is read on the drawing forming a part of this specification and in which similar reference characters are used to designate similar parts throughout the several views, of which;

Figure 1:
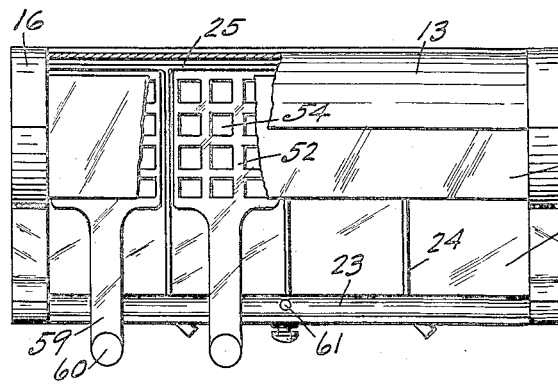
Fig. 1 is a plan view of the invention with a portion of the canopy and a portion of the toasting shelf cut away to show the holders or grids.

The invention consists of a base having a front 10, sides 11, roasting top 12 and a back panel, a canopy or hood 13 having a down-turned flange 14, removable end covers 15 having encompassing flanges 16, and, auxiliary end plates 17, heating units and sandwich holders.

The base front panel 10 is provided with suitable switches 18 for control of the heating units, and a conductor outlet 19 which is interchangeable with the plug 20, whereby the conductor cord 21 may be connected at either side of the base.

A drawer 22 is slidably mounted in the front and forms a receiver for oil or juices from the products being cooked, a drain gutter extending along the entire front of the base and communicating with the receiver.

The top of the base or the roasting top is provided with a series of grid retaining and positioning ridges 24, and has a slight slope toward the gutter 23, and is also provided with a rear ridge or dam 25 to prevent passage of oil or juices over the back of the base.

The ends 11 are each provided with an opening 26, and a recess 27 in the top of the base at each end registers with these openings, screw holes being provided for attachment of the end covers as shown at 28.

Secured to the base at its ends are auxiliary end plates, or toasting top supports, which are provided with ears 29 by which they are secured through the medium of screws or bolts 30. An opening 31 is provided in each end plate 17 for receiving the toasting shelf 32 in which the heating units are freely supported. A boss 33 provides additional securing means for the end covers.

The end covers 15 fit over the hood ends and into the recessed portion 34 of the ends 11, whereby they have their surfaces flush with the surfaces 11.

The toasting top is downwardly and inwardly flanged along both sides as shown at 35, the heating units 36 being freely supported by the inturned flanges 35 and are differentially heat insulated on their top and bottom surfaces, and have their undersurface almost fully exposed, while additional heat insulation 37 is secured either to the under-surface of the plane section of the toasting top or to the top surface of the heating unit, the thickness of this insulation depending on its heat conductivity and the heat required to properly toast the bun half 38 while the filler of the sandwich is being cooked, this insulation being such as to provide the proper balance of heat, to provide a radiant roasting heat beneath, and a conductive toasting heat above to the toasting top, when both operations are carried on simultaneously.

The heating units are flat as shown, and one is inserted in the toasting top from each end, substantially, but not quite meeting at the center 39 as shown. These units are provided with terminals 40 to which the conductors 41 are removably attached and which pass through the recess 27 and opening 26 to the control switches 18.

It will be noted that replacement of a heating unit merely requires the removal of screws 42 from the end covers, the removal of the covers, freeing the terminals 40 from the conductors 41, and sliding the heating unit half from the pocket formed in the toasting top, and sliding and securing a new unit in place by attachment of the conductors and replacement of the covers.

The grids or sandwich holders consist, in their simplest form of a plate 43 having an integral handle portion 44 provided with a heat insulating grip 45, and either a terminal stop flange 46, or side flanges 47, the side flanges permitting the holder to be inverted to bring the sandwich closer to the heating unit, since, in the inverted position, the flanges 47 form legs or spacers.

Figures 4, 5, 6:
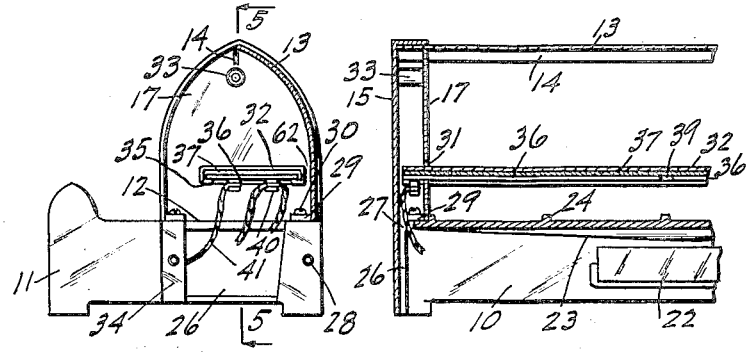
Fig. 4 is a view similar to Fig. 3 but with the end cover plate removed for the removal or insertion of a heating element.
Fig. 5 is a fragmentary section taken on line 5—5 of Fig. 4.
Fig. 6 is a fragmentary perspective view of the standard holder for use with the invention.
Figure 9:
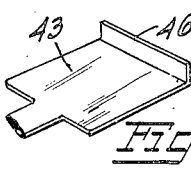

The grid shown in Fig. 6 is the more desirable form for ordinary use, and is composed of two elements of a shape similar to that shown in Fig. 9, with the end flanges hinged together, the right angle portions 48 and 49 corresponding to the flange 46 and being hinged together at 50. A foraminous structure is provided, openings 51 of any desired shape being formed in both elements, all modifications having handles similar to that shown at 44.

Figure 7:
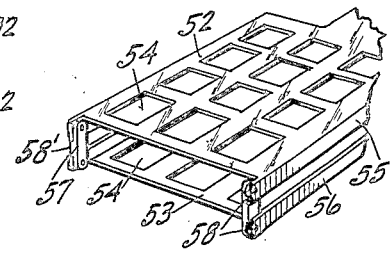
Fig. 7 is a modification showing the space-variable, reversible holder or grid.
Figure 2:
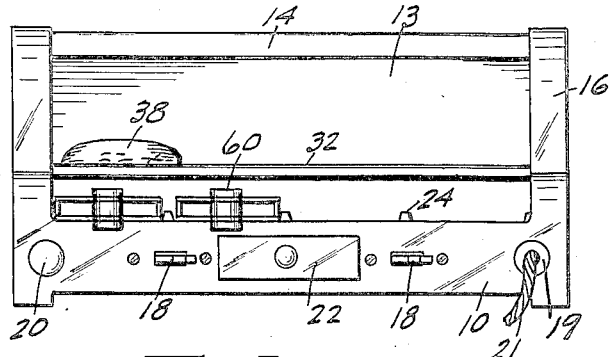
Fig. 2 is a front elevation of the invention.
Figure 3:
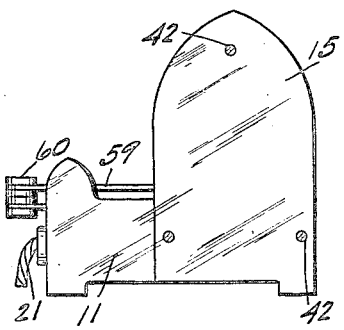
Fig. 3 is a side elevation of the invention.

A very desirable modification of the grid or holder is shown in Fig. 7 being of a universal type, in which the sandwich may be arranged closer to the heating unit, or a thinner sandwich roasted or toasted, and this modification is included into the two views, Figs. 1 and 2.

Figure 8:
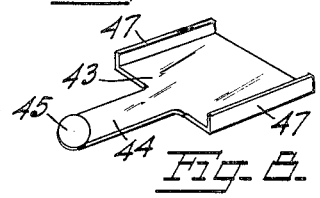
Figs. 8 and 9 are other modifications of the sandwich holder, shown in the simplest forms.

In this modification, two elements are formed similarly to that shown in Fig. 8, and consists of two grid elements 52 and 53, each of which is provided with a plurality of openings 54 and have side flanges 55 and 56 which are hinged to links or spacing elements 57 as shown at 58, these spacing elements having flange cooperating portions 59 integral therewith to cause proper spacing and prevent collapse of one element over the other, since the leverage of the upper element will maintain the links 57 and 58 from tipping back and the flanges 56 will prevent the links from tipping forward. The two elements may be instantly reversed, in which case the flanges project away from each other, and the lower grid flanges form rests and spacers.

A suitable handle 59 is formed integrally with each member and spacing grips 60 of disc-like form, and made of heat insulating material are provided.

The switches 18 respectively control the right hand and left hand heating units 36 so that only half the toaster may be placed in operation when so desired.

One portion of the bun or bread topped with a suitable filler, or a patty of hamburger, is placed on the holder, Figs. 8 or 9, or between the two members of the holder Fig. 6 or Fig. 7 with the holder in its open position, the holder closed, gripping the product between the two members while exposing the major portion of the surface through the openings 54. The holder with its contents is placed in position as shown in Figs. 1 and 2, and the other half of the bun or bread is placed on the toasting shelf.

The heat from the heating unit is radiated down and through the openings 54 directly striking the food, toasting or roasting it as may be desired. When one side is cooked the holder is turned over, with its contents and placed back in position to cook the other side of the food.

Any grease or juices from the product, extracted by heating or draining, flows to the drain gutter 23, and thence through the drain 61 into the drawer 22, from which it may be discarded as desired.

It will be noted that an air space 62 is provided back of the toasting shelf to allow free circulation of air about the unit and over the sandwich, thus obtaining a more uniform distribution of heat, and also, that in the event of a heating unit burning out, that the unit is easily replaced and that the heating unit is differentially heat insulated to insure a proper contact toasting temperature and a radiant roasting temperature.

It will be understood that variations in construction and arrangement of parts which are consistent with the appended claims may be resorted to without detracting from the spirit or scope of the invention or sacrificing any of the advantages thereof.

I claim:

1. A sandwich toaster comprising a housing having a front, a hood, a roasting top, a toasting top spaced above the roasting top, removable end covers, and a heating unit slidably supported in each end of the toasting top and freely removable upon removal of an end cover, and differentially heat insulated on its upper and lower surfaces to provide a radiant roasting temperature beneath and a conductive toasting temperature to the toasting top.

2. A sandwich toaster comprising a housing having a front, a hood, a roasting top, a toasting top spaced above the roasting top, removable end covers, and a heating unit slidably mounted in each end of the toasting top and removable upon removal of an end cover and differentially heat insulated on its upper and lower surfaces to provide a radiant roasting temperature beneath and a conductive toasting temperature to the toasting top, and a sandwich holder, and positioning means therefor integral with the roasting top, and means included in the holder for maintaining the sandwich from curling to prevent contact with the heating unit while permitting the greater portion of the food product top face to be acted on by the radiant heat.

3. A sandwich toaster comprising a housing having a front, a hood, a roasting top, a toasting top spaced above the roasting top, removable end covers, and a heating unit slidably mounted within each end of the toasting top and removable upon removal of an end cover, and a drain gutter formed in the roasting top, a receptacle in communication with the gutter and mounted in the front and freely removable therefrom for disposal of the contents, and a sandwich holder comprising two hingedly connected grids having foraminous structure, permitting direct action of radiant heat on the sandwich and coincidently preventing curling to maintain the sandwich out of contact with the heating unit.

4. A sandwich toaster comprising a housing having a front, a hood, a roasting top, a toasting top spaced above the roasting top, removable end covers, and a heating unit slidably mounted within each end of the toasting top and removable upon removal of the end cover, and a drain gutter formed in the roasting top, a receptacle in communication with the gutter and mounted in the front and removable for disposal of the contents, and a sandwich holder comprising two hingedly connected grids having a plurality of openings therethrough to permit direct action of radiant heat on the sandwich and maintaining the sandwich out of contact with the heating unit.

5. A sandwich toaster comprising a base having a roasting top and a front panel and ends, a drain gutter formed in the top and a drain aperture therefor, a drawer removably mounted in the front panel and receiving drainage from the drain aperture, a toasting top in superposed relation to the roasting top and consisting of a plate downwardly and inwardly flanged along each side, a heating unit mounted within each end of the toasting top and insertable and removable from the ends and supported by the flanges, a support for each end of the toasting top and a removable cover for each end, removal of which permits the withdrawal of the associated heating unit from the toasting top.

6. A sandwich toaster comprising a base having a roasting top and a front panel and ends, a drain gutter formed in the top and a drain aperture therefor, a drawer mounted in the front panel and receiving drainage from the drain aperture, a toasting top spaced above the roasting top and consisting of a plate downwardly and inwardly flanged along each side, a heating unit mounted within each end of the toasting top and freely removable from the ends and supported by the flanges, a support for each end of the toasting top and a cover for each end, removal of which permits the withdrawal of the heating unit from the toasting top, said heating unit being differentially heat insulated on its upper and lower surfaces to provide a radiant roasting temperature beneath and a conductive toasting temperature above.

7. A sandwich toaster comprising a base having a roasting top and a front panel and ends, a drain gutter formed in the top and a drain aperture therefor, a drawer removably mounted in the front panel and receiving drainage from the drain aperture, a toasting top in superposed relation to the roasting top and consisting of a plate downwardly and inwardly flanged along each longitudinal edge, a heating unit mounted within each end of the toasting top and insertable and removable from the ends and supported by the flanges, a support for each end of the toasting top and a removable cover for each end, removal of a cover permitting the withdrawal or insertion of a heating unit, and a sandwich holder formed of two hingedly cooperating grids provided with a plurality of heat admitting openings, and maintaining the sandwich out of contact with the heating unit.

8. A sandwich toaster comprising a base having a roasting top, a front panel and ends, a drain gutter formed in the top and a drain aperture therefor, a drawer mounted in the front panel and receiving drainage from the drain aperture, a toasting top and a heating unit within the toasting top and insertable from the end, a support for each end of the toasting top, and a cover for each end removable for replacement of the heating unit, said heating unit being differentially heat insulated on its upper and lower surfaces to provide a radiant roasting temperature beneath and a conductive toasting temperature above, and a sandwich holder consisting of two spaced apart, hingedly connected grids having each a plurality of heat admitting openings and maintaining the sandwich out of contact with the heating unit.

9. In combination with a sandwich toaster having a roasting top and a canopy; a toasting top and supports therefor supporting the toasting top in spaced relation to the back wall of the canopy and to the roasting top, a heating unit slidably insertable within each end of the toasting top, and a removable cover for each end of the toaster providing access to the heating units for replacement thereof, and a sandwich holder composed of two spaced apart, hingedly connected grids, each of which have a plurality of heat admitting openings formed therethrough, said holders maintaining a sandwich from curling and thereby preventing contact of the sandwich with the heating unit.

10. In combination in a sandwich toaster; a toasting top consisting of a plane plate flanged downwardly and thence inwardly along both longitudinal edges and open at the ends, heat insulation secured to the under surface of the plane portion of the plate, and a flat heating unit half freely insertable from each end and freely supported by the inwardly extending flanges.

11. In combination in a sandwich toaster, a toasting top consisting of a plate having a flat top surface and flanged downwardly and thence inwardly along both longitudinal edges and open at the ends, heat insulation secured to the undersurface of the flat portion of the plate, and a flat heating unit freely insertable in each end of the top and freely supported by the inwardly extending flanges, and a sandwich holder having associated means for preventing curling of the sandwich thus maintaining the sandwich out of contact with the heating unit.

KENNETH E. BEMIS.